United States Patent
Han et al.

(10) Patent No.: US 10,756,889 B2
(45) Date of Patent: Aug. 25, 2020

(54) CERTIFICATED QUANTUM CRYPTOGRAPHY SYSTEM AND METHOD

(71) Applicant: KOREA INSTITUTE OF SCIENCE AND TECHNOLOGY, Seoul (KR)

(72) Inventors: Sangwook Han, Seoul (KR); Sungwook Moon, Seoul (KR); Yongsu Kim, Seoul (KR); Sangyun Lee, Seoul (KR); Youngwook Cho, Seoul (KR); Minsung Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 270 days.

(21) Appl. No.: 16/104,350

(22) Filed: Aug. 17, 2018

(65) Prior Publication Data
US 2019/0379536 A1 Dec. 12, 2019

(30) Foreign Application Priority Data

Jun. 11, 2018 (KR) .................. 10-2018-0066781

(51) Int. Cl.
*H04L 9/08* (2006.01)
*H04L 9/32* (2006.01)
*H04L 9/30* (2006.01)

(52) U.S. Cl.
CPC .............. *H04L 9/0852* (2013.01); *H04L 9/30* (2013.01); *H04L 9/3226* (2013.01); *H04L 9/3236* (2013.01)

(58) Field of Classification Search
CPC ....... H04L 9/0852; H04L 9/30; H04L 9/3226; H04L 9/3236

USPC ........................................................ 713/171
See application file for complete search history.

(56) References Cited

U.S. PATENT DOCUMENTS

| | | | | |
|---|---|---|---|---|
| 9,350,542 | B2 * | 5/2016 | Takahashi | H04L 9/0855 |
| 9,755,826 | B2 * | 9/2017 | Tanizawa | H04L 9/0822 |
| 10,069,634 | B2 * | 9/2018 | Tseng | H04L 9/3265 |
| 10,103,880 | B2 * | 10/2018 | Fu | H04L 9/0894 |
| 10,164,778 | B2 * | 12/2018 | Fu | H04L 9/30 |
| 10,230,525 | B2 * | 3/2019 | Campagna | H04L 9/0836 |
| 10,313,115 | B2 * | 6/2019 | Yuan | H04L 9/12 |

(Continued)

OTHER PUBLICATIONS

"Applied Cryptography," Protocols, Algorithms, and Source Code in C, by Bruce Schneier (Year: 1996).*

(Continued)

*Primary Examiner* — Dant B Shaifer Harriman
(74) *Attorney, Agent, or Firm* — Rabin & Berdo, P.C.

(57) ABSTRACT

A certificated quantum cryptography method is provided. The method is performed by a quantum cryptography server connected to a first communication device and a second communication device which perform quantum key distribution. The method includes step of receiving a first quantum public key generated by the first communication device and a second quantum public key generated by the second communication device and registering measurement outcomes of the first and second quantum public keys. When first basis information and second basis information acquired by performing quantum key distribution between the first and second communication devices are signed and exchanged, the method includes the step of receiving a third quantum public key and a fourth quantum public key.

24 Claims, 5 Drawing Sheets

(56) References Cited

U.S. PATENT DOCUMENTS

| 10,402,593 | B2* | 9/2019 | Maximov | G06F 21/64 |
|---|---|---|---|---|
| 10,447,472 | B2* | 10/2019 | Kurian | H04L 9/0852 |
| 10,491,383 | B2* | 11/2019 | Fu | G06F 21/606 |
| 10,505,724 | B2* | 12/2019 | Fu | H04L 9/0852 |
| 2006/0088157 | A1* | 4/2006 | Fujii | H04L 9/3006 |
| | | | | 380/30 |
| 2013/0083926 | A1* | 4/2013 | Hughes | H04L 9/08 |
| | | | | 380/278 |

OTHER PUBLICATIONS

Charles H. Bennett et al., "Experimental Quantum Cryptography", Journal of Cryptology, 1992, pp. 3-28, vol. 5.
Karl Svozil, "Feasibility of the Interlock Protocol Against Man-In-The-Middle Attacks on Quantum Cryptography", International Journal of Quantum Information, 2005, pp. 649-654, vol. 3, No. 4.

* cited by examiner

US 10,756,889 B2

CERTIFICATED QUANTUM CRYPTOGRAPHY SYSTEM AND METHOD

CROSS-REFERENCE TO RELATED APPLICATION

This application claims priority to and the benefit of Korean Patent Application No. 2018-0066781, filed on Jun. 11, 2018, the disclosure of which is incorporated herein by reference in its entirety.

BACKGROUND

1. Field of the Invention

The present invention relates to quantum cryptography technology, and more specifically, to a certificated quantum cryptography system and method which perform quantum key distribution and quantum entity and key authentication.

2. Discussion of Related Art

Generally, modern cryptography systems, which are implemented on the basis of computational complexity, are threatened by quantum computers, whereas quantum cryptography systems are based on the principles of quantum mechanics and can be safe from such threat. However, a quantum cryptography system provides confidentiality by distributing secret keys, but fails to provide authentication, integrity, and non-repudiation. That is, while the modern cryptography system provides functions to verify confidentiality, authentication, integrity, and non-repudiation, i.e., provides functions to verify whether there is an eavesdropper, whether the other party is authentic, whether the content has been changed, and whose message is right, the quantum cryptography system only provides a function that enables confidential communication using a secret key in accordance with a remote secret key sharing system.

Particularly, it is widely known that a quantum key distribution (QKD) system representing quantum cryptography does not provide authentication and hence is vulnerable to a man-in-the-middle-attack. The most fundamental approach to solve such a problem is to introduce a certification scheme, which is an authentication method suitable for a quantum key distribution cryptography system, into the QKD system. Currently, commercial QKD uses a certification scheme based on modern cryptography. For example, the European Telecommunications Standard Institute (ETSI) has proposed a solution in which the QKD system is certificated using a digital signature based on Rivest Shamir Adleman (RSA). However, it is self-contradictory to apply the certification scheme based on modern cryptography to the QKD system, which is the only technology that can reassure security even in the quantum computer environment. Therefore, despite the development of quantum computers, finding a secure certification method is a prerequisite for commercialization of QKD.

PRIOR ART DOCUMENT

Patent Document (Patent Document 1) U.S. Patent Publication No. US 2013/0083926

Non-Patent Documents (Non-Patent Document 1) C. H. Bennett, et al. "Experimental quantum cryptography," Journal of cryptology, 1992

(Non-Patent Document 2) K. Svozil. "Feasibility of the interlock protocol against man-in-the-middle attacks on quantum cryptography" International Journal of Quantum Information, 2005

SUMMARY OF THE INVENTION

One objective of the present invention is to provide a certificated quantum cryptography system and method for implementing a quantum cryptography system to which quantum entity authentication and quantum key authentication based on a quantum signature are applied.

Another objective of the present invention is to provide functions of a certificated quantum cryptography system and method which provides integrity, mutual quantum entity authentication, mutual quantum key authentication, and non-repudiation of secret key sharing, as well as confidentiality.

In one general aspect, there is provided a certificated quantum cryptography method, which is performed by a quantum cryptography server connected to a first communication device and a second communication device which perform quantum key distribution, including operations of: (a) receiving a first quantum public key generated by the first communication device and a second quantum public key generated by the second communication device and registering measurement outcomes of the first and second quantum public keys; (b) when first basis information and second basis information acquired by performing quantum key distribution between the first and second communication devices are signed and exchanged, receiving a third quantum public key generated by the second communication device on the basis of the first basis information and a fourth quantum public key generated by the first communication device on the basis of the second basis information and registering measurement outcomes of the third and fourth quantum public keys: and (c) verifying whether the first quantum public key matches the third quantum public key and whether the second quantum public key matches the fourth quantum public key.

The certificated quantum cryptography method may further include, prior to the operation (a), receiving and registering first authentication information generated by the first communication device and second authentication information generated by the second communication device.

The operation (a) may include, when the first authentication information is received with the first quantum public key from the first communication device, checking whether the received first authentication information matches registered first authentication information, and, when the second quantum public key is received with the second authentication information from the second communication device, checking whether the received authentication information matches registered second authentication information.

The operation (a) may include generating, by the first communication device, a first private key sequence, a first verification parameter, and the first quantum public key, and generating, by the second communication device, a second private key sequence, a second verification parameter, and the second quantum public key, wherein each of the first and second verification parameters is a child node of a Merkle tree which is applied to each of the first and second private key sequences and each of the first and second quantum public keys is obtained by continuously applying the Merkle tree and conjugate coding to private keys included in each of the first and second private key sequences.

The operation (b) may include, when the first communication device receives an information encoded photon in a predetermined polarization state from the second communication device, acquiring, by the first communication device, a raw key on the basis of the photon in the predetermined polarization state and generating the first basis information including a first basis used in acquiring the raw key and signing the first basis information, wherein the first basis information includes the first basis, a first private key, and a first verification parameter, the first private key corresponds to one private key in the first private key sequence, and the first verification parameter corresponds to generation information used in generating a first public key.

The operation (b) may include, when the second communication device receives the signed first basis information, acquiring, by the second communication device, a third public key by applying the first private key and the first verification parameter, which are included in the signed first basis information, to a Merkle tree and acquiring the third quantum public key by applying the third public key to conjugate coding.

The operation (b) may include, when the first communication device receives the signed second basis information, acquiring, by the first communication device, a fourth public key by applying a second private key and a second verification parameter, which are included in the signed second basis information, to a Merkle tree and acquiring the fourth quantum public key by applying the fourth public key to conjugate coding, wherein the second basis information includes a second basis, the second private key, and the second verification parameter, which are used in encoding information in the photon in the predetermined polarization state by the second communication device, the second private key corresponds to one private key in the second private key sequence and the second verification parameter corresponds to generation information used in generating a second public key.

The operation (c) may include operations of (c-1) in order to verify whether the first quantum public key matches the third quantum public key, comparing bit information for the measurement outcome of the first quantum public key and the measurement outcome of the third quantum public key to a measurement outcome of a quantum state corresponding to the bit information with an expectation value of a Hamming distance and (c-2) in order to verify whether the second quantum public key matches the fourth quantum public key, comparing bit information for the measurement outcome of the second quantum public key and the measurement outcome of the fourth quantum public key to a measurement outcome of a quantum state corresponding to the bit information with an expectation value of a Hamming distance.

The operation (c-1) may include combining the measurement outcome of the first quantum public key with the measurement outcome of the third quantum public key, comparing the combined measurement outcome to a first public key used in generating the first quantum public key or a third public key used in generating the third quantum public key, and computing an expectation value of a Hamming weight which indicates whether the combined measurement outcome matches the first public key or the third public key.

The operation (c-2) may include combining the measurement outcome of the second quantum public key with the measurement outcome of the fourth quantum public key, comparing the combined measurement outcome to a second public key used in generating the second quantum public key or a fourth public key used in generating the fourth quantum public key, and computing an expectation value of a Hamming weight which indicates whether the combined measurement outcome matches the second public key or the fourth public key.

In the operation (c), when it is verified that the measurement outcome of the first quantum public key matches the measurement outcome of the third quantum public key and the measurement outcome of the second quantum public key matches the measurement outcome of the fourth quantum public key, the first basis information generated and signed by the first communication device and the second basis information generated and signed by the second communication device may be accordingly verified.

When it is verified that the measurement outcomes of the first and second quantum public keys match the measurement outcomes of the third and fourth quantum public keys, respectively, a quantum key sifted on the basis of the first and second bases may be shared between the first and second communication devices.

In another general aspect, there is provided a certificated quantum cryptograph system comprising a first communication device, a second communication device which performs mutual key distribution with the first communication device, and a quantum cryptography server connected to the first and second communication devices, wherein the first communication device generates a first quantum public key, receives second basis information acquired by the second communication device according to quantum key distribution, and generates a fourth quantum public key on the basis of the second basis information, the second communication device generates a second quantum public key, receives first basis information acquired by the first communication device according to quantum key distribution, and generates a third quantum public key on the basis of the first basis information, and the quantum cryptography server verifies whether a measurement outcome of the first quantum public key matches a measurement outcome of the third quantum public key and whether a measurement outcome of the second quantum public key matches a measurement outcome of the fourth quantum public key.

The first communication device may generate first authentication information, the second communication device may generate second authentication information, and the quantum cryptography server may receive and register the first and second authentication information.

When the quantum cryptography server receives the first authentication information with the first quantum public key from the first communication device, the quantum cryptography server may check whether the received first authentication information matches registered first authentication information, and, when receiving the second authentication information with the second quantum public key from the second communication device, check whether the received second authentication information matches registered second authentication information.

The first communication device may generate a first private key sequence, a first verification parameter, and the first quantum public key, the second communication device may generate a second private key sequence, a second verification parameter, and the second quantum public key, each of the first and second verification parameters may be a child node of a Merkle tree which is applied to each of the first and second private key sequences, and each of the first and second quantum public keys may be obtained by continuously applying the Merkle tree and conjugate coding to private keys included in each of the first and second private key sequences.

When the first communication device may receive an information encoded photon in a predetermined polarization state from the second communication device, the first communication device may acquire a raw key on the basis of the photon in the predetermined polarization state, and generate the first basis information including a first basis used in acquiring the raw key, and sign the first basis information, wherein the first basis information includes the first basis, a first private key, and a first verification parameter, the first private key corresponds to one private key in the first private key sequence, and the first verification parameter corresponds to generation information used in generating the first public key.

When the second communication device receives the signed first basis information, the second communication device may acquire a third public key by applying the first private key and the first verification parameter, which are included in the signed first basis information, to a Merkle tree and acquire the third quantum public key by applying the third public key to conjugate coding.

When the first communication device receives signed second basis information, the first communication device may acquire a fourth public key by applying a second private key and a second verification parameter, which are included in the signed second basis information, to a Merkle tree and acquire the fourth quantum public key by applying the fourth public key to conjugate coding, wherein the second basis information includes a second basis, the second private key, and the second verification parameter, which are used in encoding information in the photon in the predetermined polarization state by the second communication device, the second private key corresponds to one private key in the second private key sequence and the second verification parameter corresponds to generation information used in generating a second public key.

The quantum cryptography server may compare bit information for the measurement outcome of the first quantum public key and the measurement outcome of the third quantum public key to a measurement outcome of a quantum state corresponding to the bit information with an expectation value of a Hamming distance, in order to verify whether the first quantum public key matches the third quantum public key, and compare bit information for the measurement outcome of the second quantum public key and the measurement outcome of the fourth quantum public key to a measurement outcome of a quantum state corresponding to the bit information with an expectation value of a Hamming distance, in order to verify whether the second quantum public key matches the fourth quantum public key.

The quantum cryptography server may combine the measurement outcome of the first quantum public key with the measurement outcome of the third quantum public key, compare the combined measurement outcome to a first public key used in generating the first quantum public key or a third public key used in generating the third quantum public key, and compute an expectation value of a Hamming weight which indicates whether the combined measurement outcome matches the first public key or the third public key.

The quantum cryptography server may combine the measurement outcome of the second quantum public key with the measurement outcome of the fourth quantum public key, compare the combined measurement outcome to a second public key used in generating the second quantum public key or a fourth public key used in generating the fourth quantum public key, and compute an expectation value of a Hamming weight which indicates whether the combined measurement outcome matches the second public key or the fourth public key.

When it is verified that the measurement outcome of the first quantum public key matches the measurement outcome of the third quantum public key and the measurement outcome of the second quantum public key matches the measurement outcome of the fourth quantum public key, the first basis information generated and signed by the first communication device and the second basis information generated and signed by the second communication device may be verified.

When it is verified that the measurement outcomes of the first and second quantum public keys match the measurement outcomes of the third and fourth quantum public keys, respectively, a quantum key sifted on the basis of the first and second bases may be shared between the first and second communication devices.

DETAILED DESCRIPTION OF EXEMPLARY EMBODIMENTS

Figure 1:
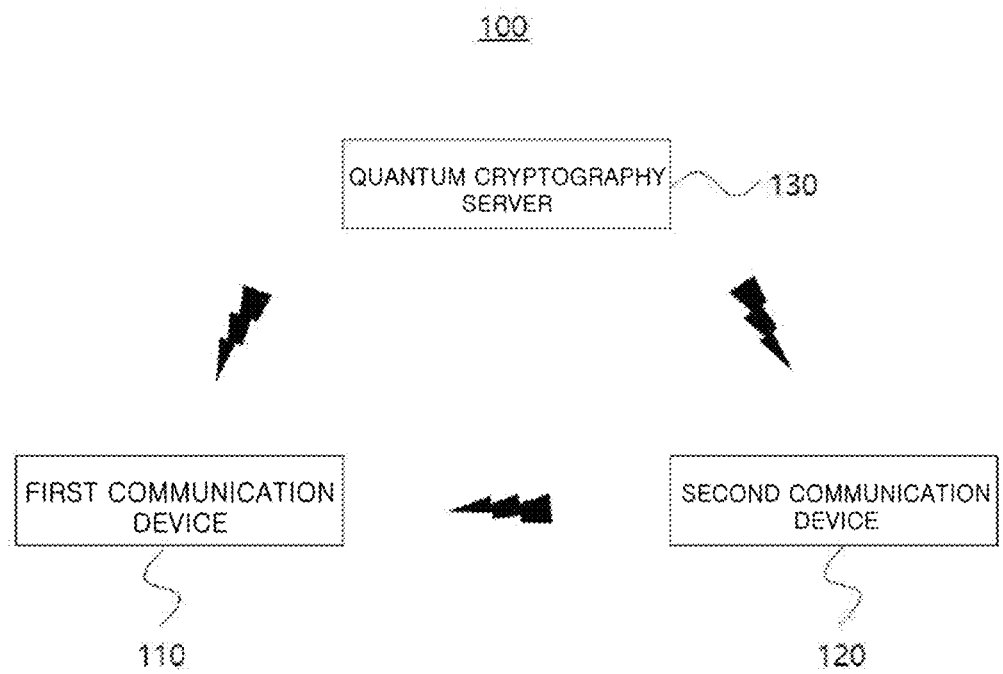
FIG. 1 is a configuration diagram illustrating a certificated quantum cryptosystem according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

In addition, identification letters (e.g., a, b, c, etc.) for respective steps or operations are used for the sake of description and do not specify any particular order. The steps or operations may be performed in a different order than stated unless specifically mentioned in context. That is, the steps or operations may be performed in the same order as described, and some steps or operations may be performed substantially concurrently, or may be performed in reverse order.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, steps, operations, elements, and/or components, but do not preclude the presence or addition of one or more other features, steps, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Further, in the description of the present invention, detailed descriptions of related well-known functions that are determined to unnecessarily obscure the gist of the present invention will be omitted. Some terms described below are defined in consideration of functions in the present invention, and meanings thereof may vary depending on, for example, a user or operator's intention or custom. Therefore, the meanings of terms should be interpreted based on the scope throughout this specification.

FIG. 1 is a configuration diagram illustrating a quantum cryptosystem according to an exemplary embodiment of the present invention.

Referring to FIG. 1, the quantum cryptosystem 100 may include a first communication device 110, a second communication device 120, and a quantum cryptography server 130.

Here, the first communication device 110 is a receiver (so called, Bob), and the second communication device 120 is a transmitter (so called, Alice). Preferably, the first communication device 110 and the second communication device 120 are communication devices that perform a process of distributing a quantum key. Each of the communication devices 110 and 120 can be easily implemented by a person skilled in the art to which the present invention pertains and the implementation method thereof may be variously modified. In addition, various methods may be applied and performed by the first communication device 110 and the second communication device 120 to distribute a quantum key, and, for example, a BB84 protocol may be applied.

Preferably, the first communication device 110 and the second communication device 120 may each generate authentication information, a private key sequence, a verification parameter, a quantum public key, and may sign basis information and transmit the signed basis information to each other so that verification of a distributed quantum key can be performed. In addition, the first communication device 110 and the second communication device 120 are connected to each other via an optical fiber and a communication cable so that quantum public key transmission and reception and quantum key distribution between the first communication device 110 and the second communication device 120 may be performed via the optical fiber and the transmission and reception of the signed basis information for verification of the quantum key may be performed via the communication cable.

The quantum cryptography server 130 is a device for verifying the quantum keys distributed from the first communication device 110 and the second communication device 120 and may be connected to the first communication device 110 and the second communication device 120 to perform verification of the distributed quantum key on the basis of pieces of data transmitted from the first communication device 110 and the second communication device 120. For example, the quantum cryptography server 130 may be an authorized institute server.

Figure 2:
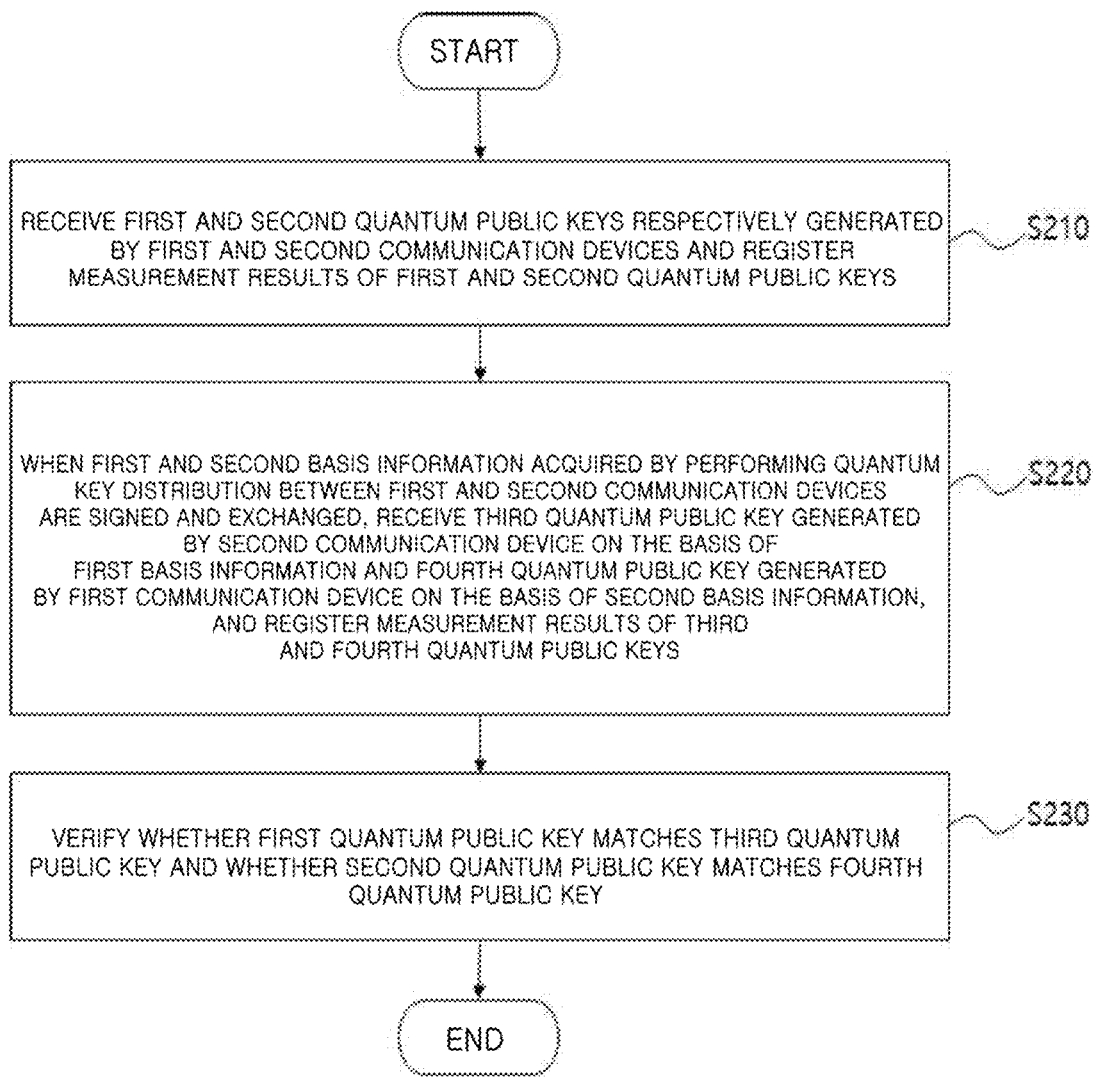
FIG. 2 is a flowchart illustrating a certificated quantum cryptography method according to one embodiment.

FIG. 2 is a flowchart illustrating a quantum cryptography method according to one embodiment.

Referring to FIG. 2, a method of receiving, by a quantum cryptography server 130 to which a first communication device 110 and a second communication device 120 are connected, data transmitted from the first communication device 110 and the second communication device 120 and performing verification of a quantum key is shown.

The quantum cryptography server 130 receives a first quantum public key generated by the first communication device 110 and a second quantum public key generated by the second communication device 120 and registers a result of measuring the first and second quantum public keys (operation S210).

When first and second basis information which are obtained by performing quantum key distribution between the first and second communication devices 110 and 120 are signed and exchanged between the first and second communication devices 110 and 120, the quantum cryptography server 130 receives third quantum public key generated by the second communication device 120 on the basis of the first basis information and a fourth quantum public key generated by the first communication device 110 on the basis of the second basis information and register a result of measuring the third and fourth quantum public keys (operation S220).

The quantum cryptography server 130 verifies whether the first quantum public key matches the third quantum public key and verifies whether the second quantum public key matches the fourth quantum public key (operation S230).

Hereinafter, a certificated quantum cryptography method performed through the first and second communication devices 110 and 120 and the quantum cryptography server 130 will be described in more detail with reference to FIG. 3. For operations performed identically in the first and second communication devices 110 and 120, a description provided for one communication device may be equally applied to the other communication device and the operations performed in the first and second communication devices 110 and 120 may be performed by a controller installed in each of the first and second communication devices 110 and 120, or may be performed through a separately provided device. In addition, although the operations in this embodiment are shown in sequential order, some operations may be performed substantially concurrently, or be performed in the reverse order. The order of performing the operations may is not limited to that shown in FIG. 3 and various modifications thereof are possible.

Figure 3:
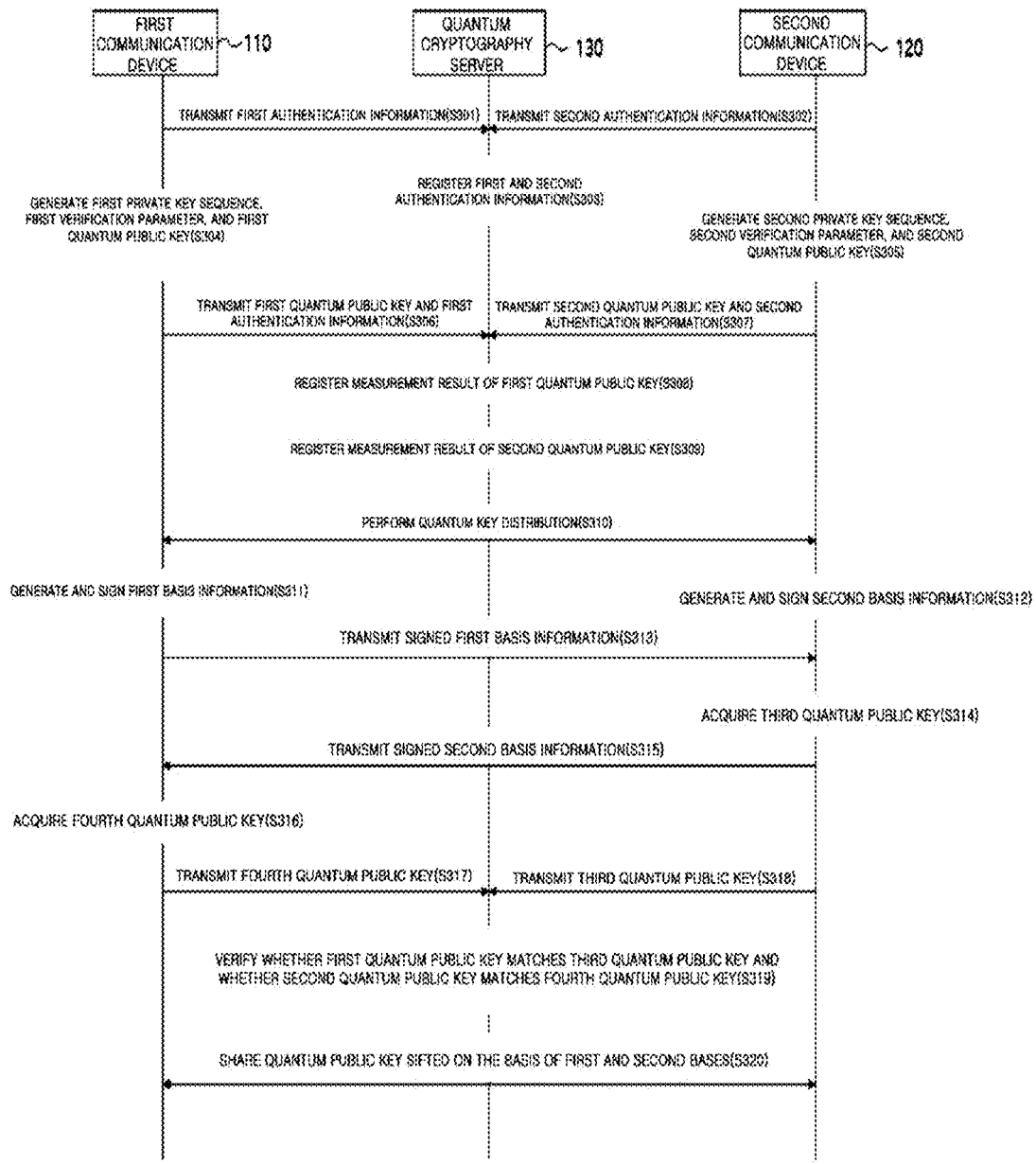
FIG. 3 is a flowchart illustrating a certificated quantum cryptography method according to one embodiment in more detail.

Referring to FIG. 3, the first communication device 110 generates and transmits first authentication information to the quantum cryptography server 130 (operation S301) and the second communication device 120 generates and transmits second authentication information to the quantum cryptography server 130 (operation S302). That is, through the first encounter between the communication device 110 and the quantum cryptography server 130, and the first encounter between the communication device 120 and the quantum cryptography server 130, the first communication device 110 and the quantum cryptography server 130 share the first authentication information $I_{AC}$ therebetween and the second communication device 120 and the quantum ctyptography server 130 share the second authentication information $I_{BC}$ therebetween. Here, the sizes of the first and second authentication information $I_{AC}$ and $I_{BC}$ are the minimum sizes that allow the quantum cryptography server 130 to confirm that the pieces of received information are transmitted from the first and second communication devices 110 and 120.

The quantum cryptography server 130 registers the first and second authentication information received respectively from the first and second communication devices 110 and 120 (operation S303).

The first communication device 110 generates a first private key sequence, a first verification parameter, and a first quantum public key (operation S304) and the second communication device 120 generates a second private key sequence, a second verification parameter, and a second quantum public key (operation S305). More specifically, the first communication device 110 generates the first private key sequence $S_M^A=(S_{m_0}^A, S_{m_1}^A, \ldots, S_{m_{N-1}}^A)$, acquires the first public key $P_A$ by applying a Merkle tree to the first private key sequence $S_M^A=(S_{m_0}^A, S_{m_1}^A, \ldots, S_{m_{N-1}}^A)$, and acquires the first quantum public key $|P_A\rangle$ by applying conjugate coding to the first public key $P_A$. In this case, the first private key sequence $S_M^A=(S_{m_0}^A, S_{m_1}^A, \ldots, S_{m_{N-1}}^A)$ may correspond to a random message sequence $M=(m_0, m_1, \ldots, m_{N-1})$, where represents all messages that can be generated by the first communication device 110. In like manner, the second communication device 120 may acquire the second public key $P_B$ by applying a Merkle tree to the second private key sequence $S_M^B=(S_{m_0}^B, S_{m_1}^B, \ldots, S_{m_{N-1}}^B)$, and acquire the second quantum public key $|P_B\rangle$ by applying conjugate coding to the second public key $P_B$. Preferably, when verification parameters that correspond to a private key and a child node are applied to a Merkle tree, a quantum public key may be obtained as a root value of the topmost of the Merkle tree, where the verification parameters are values that are retained by the first and second communication devices as child nodes. For example, the message sequence may be a measurement basis of quantum key distribution. When a private key sequence corresponding to the message sequence is input to a Merkle tree algorithm, it is possible to obtain a public key from a value of a root node at the topmost of the Merkle tree. When a size of an output value of the Merkle tree is set to $|2L|$, the size of the public key is $|2L|$, and the public key may be expressed as shown below.

$$P = p_0 \| p_1 \| p_2 \| \ldots \| p_{L-1}$$

Here, L denotes the number of components p constituting a public key and $p_i$ is 2-bit information, which is one of 00, 01, 10, and 11.

Conjugate coding converts the 2-bit information into a quantum state as shown below.

$$00 \rightarrow |0\rangle, 01 \rightarrow |1\rangle, 10 \rightarrow |+\rangle, 11 \rightarrow |-\rangle$$

A quantum public key accordingly acquired by applying a public key is as shown below.

$$|P\rangle = |p_1\rangle |p_2\rangle |p_3\rangle \ldots |P_L\rangle = \otimes_{n=0}^{L-1} |p_n\rangle$$

Here, $\otimes$ expresses quantum states being continuously combined with each other.

Then, the first communication device 110 transmits the first quantum public key $P_A$ and the first authentication information $I_A C$ to the quantum cryptography server 130 (operation S306) and the second communication device 120 transmits the second quantum public key $|P_B\rangle$ and the second authentication information $I_{BC}$ to the quantum cryptography server 130 (operation S307). Preferably, the first and second authentication information $I_{AC}$ and $I_{BC}$ are used for the first and second communication devices 110 and 120 to safely transmit the first and second quantum public keys $|P_A\rangle$ and $|P_B\rangle$ to the quantum cryptography server 130. For example, the first communication device 110 may transmit an encrypted first quantum public key $f_{I_{AC}}(P_A)$ to the quantum cryptography server 130. In this case, a function $f_i(.)$ is a protocol secure in a quantum environment, such as quantum one-time password encryption or an authenticated quantum direct communication protocol.

The quantum cryptography server 130 registers a result $C_A$ of measuring the first quantum public key $|P_A\rangle$ received from the first communication device 110 (operation S308). More specifically, the quantum cryptography server 130 confirms whether the first authentication information received from the first communication device 110 in operation S306 matches the first authentication information $I_{AC}$ registered in operation S303, and stores the measurement outcome $C_A$ of the first quantum public key $|P_A\rangle$ when it is determined that the received first authentication information matches the registered first authentication information $I_{AC}$ and thereby it is verified that the first quantum public key $|P_A\rangle$ is generated by the first communication device 110. Preferably, the quantum cryptography server 130 may obtain the measurement outcome by measuring the first quantum public key in the same way as the BB84 protocol. That is, the quantum cryptography server 130 may obtain the measurement outcome by measuring the first quantum public key using an arbitrary basis.

The quantum cryptography server 130 registers a result $C_B$ of measuring the second quantum public key $|P_B\rangle$ received from the second communication device 120 (operation S309). More specifically, the quantum cryptography server 130 confirms whether the second authentication information received from the second communication device 120 in operation S307 matches the second authentication information $I_{BC}$ registered in operation S303, and stores the measurement outcome $C_B$ of the second quantum public key $|P_B\rangle$ when it is confirmed that the received second authentication information matches the registered second authentication information $I_{BC}$. Thereby it is verified that the second quantum public key $|P_B\rangle$ is generated by the second communication device 120. In this case, the quantum cryptography server 130 obtains the measurement outcome by measuring the second quantum public key in the same way as the BB84 protocol.

For example, in the ideal case where no loss occurs, the measurement outcome of the first quantum public key may be $C_A=(c_A^{(0)}, c_A^{(1)}, \ldots, c_A^{(L-1)})$, which is a bit string consisting of L variable $c_A^{(i)}$, where $C_A^{(i)} \in \{00, 01, 10, 11\}$, and has a size of $|2L|$.

In one embodiment, operations S308 and S309 may be performed concurrently and a key origin may be provided through these operations.

The first communication device 110 and the second communication device 120 perform quantum key distribution (operation S310). The first communication device 110 generates and signs first basis information (operation S311) and the second communication device 120 generates and signs second basis information (operation S312) according to the quantum key distribution.

More specifically, when the first communication device 110 receives a specific-information encoded photon in a specific polarization state from the second communication device 120, the first communication device 110 obtains a raw key on the basis of the photon in a specific polarization state, generates first basis information including a first basis used in obtaining the corresponding raw key and signs the first basis information. In this case, the signed first basis information includes the first basis, a first private key $S_{m_j}^A$, and first verification parameter $G_{m_j}^A$, and the first private key $S_{m_j}^A$ may be represented as $S_{m_j} = (s_j^{(0)}, s_j^{(1)}, \ldots, s_j^{(L-1)}) \in \{00, 01, 10, 11\}$), correspond to at least one of private keys included in the first private key sequence $S_M^A$ generated in operation S304, and correspond to a hashed private key hash($S_{m_j}$). The first verification parameter ($G_{m_j}^A$) is generation information used in generating the first public key $P_A$ in operation S304, is represented as $G_{m_j} = (g_j^{(0)}, g_j^{(1)}, \ldots, g_j^{(\log_2 L-1)})$, and may be represented as the following Equation 1.

$$g_j^{(p)} = \begin{cases} v_p^{(\frac{r}{2^p}-1)}, & \text{if } \lfloor r/2^p \rfloor \equiv 1 \bmod 2 \\ v_p^{(\frac{r}{2^p}+1)}, & \text{if } \lfloor r/2^p \rfloor \equiv 0 \bmod 2 \end{cases} \quad \text{[Equation 1]}$$

Here, p=0, 1, . . . , $\log_2$ N

In addition, the second communication device 120 generates second basis information including a second basis used in encoding specific information in a photon in a specific polarization state and signs the second basis information. In this case, the second basis information includes the second basis, a second private key $S_{m_j}^B$, and a second verification parameter $G_{m_j}^B$, the second private key $S_{m_j}^B$ corresponds to at least one private key included in the second private key sequence $S_B^M$ generated in operation S305, and the second verification parameter $G_{m_j}^B$ corresponds to generation information used in generating the second public key $P_B$ in operation S305.

In this case, the verification parameters $G_{m_j}^A$ and $G_{m_j}^B$ may serve an important role in non-repudiation of the first and second communication devices 110 and 120 to prevent the first and second communication devices 110 and 120 from denying transmission of the signed first and second basis information, and, for example, when the first or second communication device 110 or 120 does not transmit the verification parameter, the operations performed above are invalidated and the corresponding communication device may be considered as a malicious user.

In one embodiment, the process of performing quantum key distribution is the same as a process of performing a BB84 protocol, which is obvious to a person skilled in the art to which the present invention pertains, and hence a detailed description thereof will be omitted. However, the BB84 protocol applied to the present invention may be regarded as being substantially the same as public communication for acquiring a key sifted via a basis, that is, exchange of the basis information in the present invention is performed through a public channel or a broadcasting channel, but there is a difference in that the first and second communication devices 110 and 120 sign the first basis information and the second basis information, respectively, thereby ensuring security of the public communication. In the present invention, it is possible to reassure integrity and origin authentication of a basis by verifying that the basis is not forged and falsified and clarifying a generator of the basis through signing the basis information, and it is therefore possible to reassure integrity and origin authentication of a key sifted via the basis. In addition, it is possible to clarify an entity that is participating in a communication in real time. In other words, when a certain entity signs a basis, such an activity is a real-time proof that the entity is a normal user, and it may be appreciated that the entity authentication is ensured. In addition, a fact that the key sifted via the basis is mutually shared may be clarified. Since a signature is generated only with a private key of a particular entity, it is not deniable that the first and second communication devices 110 and 120 share the sifted key via a basis, by exchanging their signed basis information.

The first communication device 110 transmits the signed first basis information to the second communication device 120 (operation S313) and the second communication device 120 acquires a third quantum public key on the basis of the signed first basis information (operation S314). More specifically, the second communication device 120 acquires a third public key $P'_A$ by applying the first private key SA and the first verification parameter $G_{m_j}^A$, which are included in the signed first basis information, to a Merkle tree and acquires a third quantum public key $|P'_A\rangle$ by applying the third public key $P'_A$ to conjugate coding.

The second communication device 120 transmits a signed second quantum verification parameter to the first communication device 110 (operation S315) and the first communication device 110 acquires a fourth quantum public key on the basis of the signed second basis information (operation S316). More specifically, the first communication device 110 acquires a fourth public key $P'_B$ by applying the second private key $S_{m_j}^B$ and the second verification parameter $G_{m_j}^B$, which are included in the signed second basis information, to a Merkle tree and acquires the fourth quantum public key $|P'_B\rangle$ by applying the fourth public key $P'_B$ to conjugate coding.

In this case, the first communication device 110 and the second communication device 120 may exchange the signed first and second basis information through a public channel, that is, a communication cable.

The first communication device 110 transmits the fourth quantum public key $|P'_B\rangle$ to the quantum cryptography server 130 (operation S317) and the second communication device 120 transmits the third quantum public key $|P'_A\rangle$ to the quantum cryptography server 130 (operation S318). Preferably, the third and fourth quantum public keys $|P'_A\rangle$ and $|P'_B\rangle$ may be encrypted by the function $f_f(.)$ described in operations S306 and S307 and then transmitted to the quantum cryptography server 130.

The quantum cryptography server 130 verifies whether a measurement outcome $C'_A$ of the third quantum public key $|P'_A\rangle$ matches the measurement outcome $C_A$ of the first quantum public key $|P_A\rangle$ and whether a measurement outcome $C'_B$ of the fourth quantum public key $|P'_B\rangle$ matches the measurement outcome $C_B$ of the second quantum public key $|P_B\rangle$ (operation S319) and notifies the first and second communication devices 110 and 120 of a verification result. In this case, the same basis used in measuring the first and second quantum public keys in operation S309 is used to measure the third and fourth quantum public keys. Through the verification performed in operation S319, it is possible to confirm whether the signed first and second basis information are generated by the first and second communication devices 110 and 120, respectively, and it is also possible to prevent the first communication device 110 from denying that it has received the signed second basis information and to prevent the second communication device 120 from denying that it has received the signed first basis information.

More specifically, the quantum cryptography server 130 verifies the measurement outcome $C_A$ of the first quantum public key $|P_A\rangle$ and the measurement outcome $C'_A$ of the third quantum public key $|P'_A\rangle$ using a Hamming distance of quantum signature (HDQS) and verifies the measurement outcome $C_B$ of the second quantum public key $|P_B\rangle$ and the measurement outcome $C'_B$ of the fourth quantum public key $|P'_B\rangle$ using the HDQS. Here, the HDQS is a method for quantitatively determining the integrity of a basis and is an expectation value of a Hamming weight when bit information is compared to a measurement outcome of a quantum state corresponding to the bit information with a Hamming distance. For example, when Hamming weights of Hamming distances $D(C_A,C'_A)$ and $D(C_B,C'_B)$ do not match an expectation value of a Hamming weight, it may be determined that there is an intervention of an eavesdropper (Eve) in the protocol. The use of the HDQS will be described in detail with reference to FIGS. 5 and 6.

When it is verified that the first quantum public key matches the third quantum public key and the second quantum public key matches the fourth quantum public key in operation S319, it indicates that there is no abnormality in the second basis information that the first communication device 110 has received from the second communication device 120 and there is no abnormality in the first basis information that the second communication device 120 has received from the first communication device 110, that is, it is verified that the first and second bases are not forged and manipulated. In this case, the verification of each of the measurement outcomes of the quantum public keys may be performed using the HDQS.

Then, the first communication device 110 and the second communication device 120 share a sifted quantum key which is sifted based on the first and second bases (operation S320).

Figure 4:
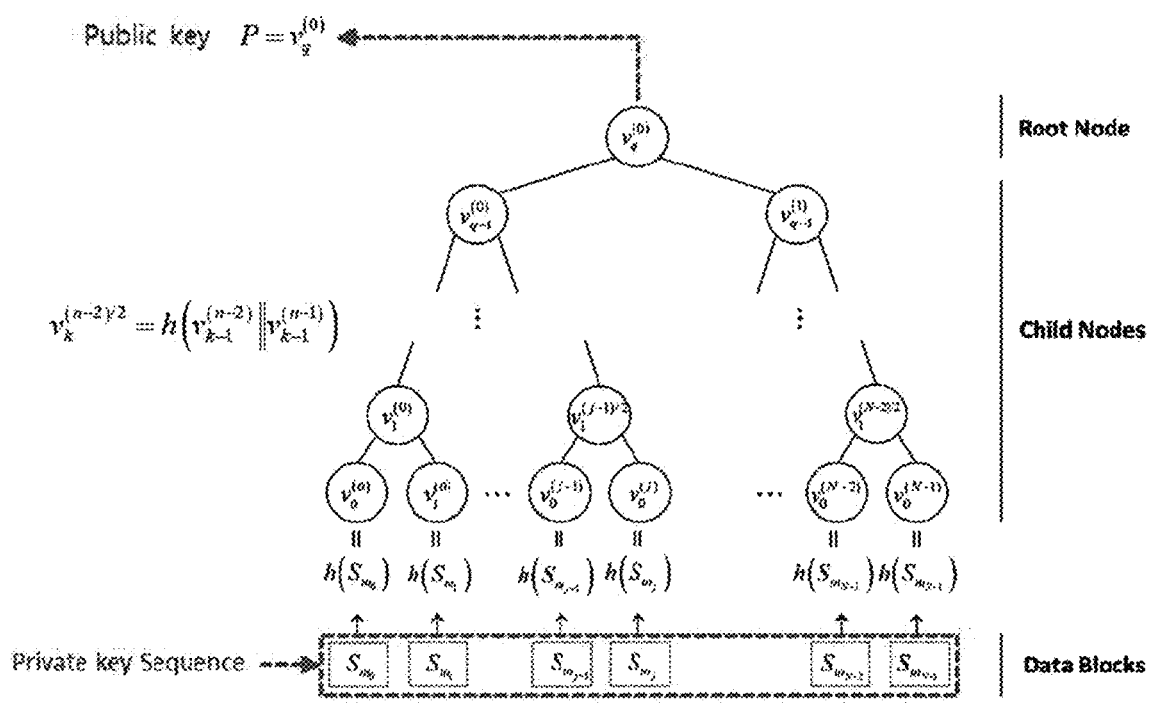
FIG. 4 is a diagram for describing a method of generating a public key using a Merkle tree.

FIG. 4 is a diagram for describing a method of generating a public key using a Merkle tree.

Referring to FIG. 4, the Merkle tree consists of data blocks, child nodes, and a root node. Here, a height of the Merkle tree is q log 2N (where N corresponds to a data size), which results from a size of a private key sequence corresponding to $N=2^q$. Preferably, the data block is an input value and a value obtained by converting an input value of the data block using a hash function is the lowermost child node $v_0^{(j)}$. Except the child node $v_0^{(j)}$ at the bottom, the other nodes are represented as $v_k^{(n-2)/2}=h(v_{k-1}^{(n-2)}||v_{k-1}^{(n-1)})$. Therefore, a root node $v_q^{(0)}$ is placed at the topmost of the Merkle tree and has a value of $h(v_{q-1}^{(0)}||v_{q-1}^{(1)})$, which is obtained by applying a hash function to two child nodes $v_{q-1}^{(0)}$ and $v_{q-1}^{(1)}$ directly below the root node. A process for the first communication device 110 and the second communication device 120 to acquire a public key using a Merkle tree is as follows.

A private key sequence $S_M=(S_{m_0}, S_{m_1}, \ldots, S_{m_{N-1}})$ is used as data blocks of the Merkle tree and each of the private keys $S_{m_j}$ input to the data blocks is converted into the lowermost child node $v_0^{(j)}=h(S_{m_j})$ to which a hash function h(.) is applied. The child nodes $v_0^{(j)}$ is computed according to the structure of the Merkle tree and the first and second communication devices 110 and 120 may ultimately obtain a value of the root node $v_q^{(0)}$. The value of the root node $v_q^{(0)}$ is used as a public key ($v_q^{(0)}=P$).

Figure 5:
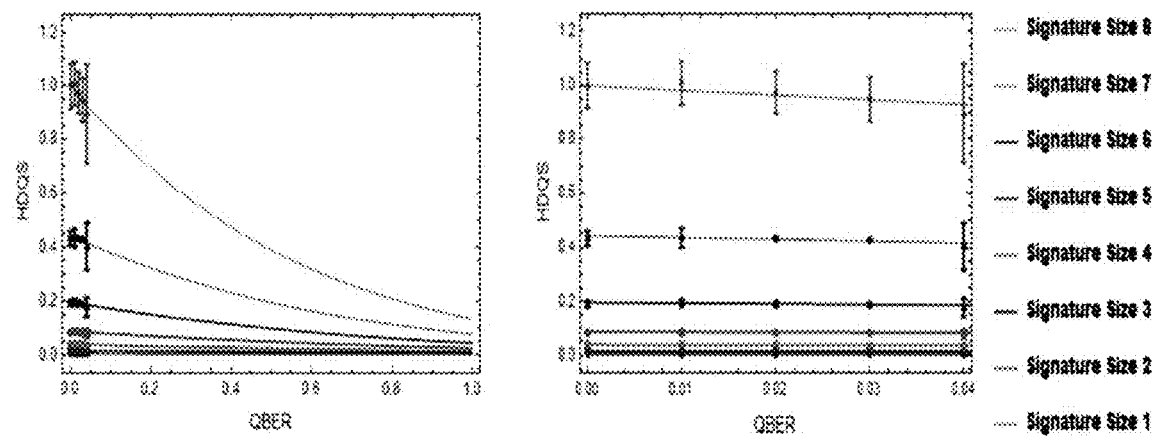
FIGS. 5 and 6 are graphs showing security verified using a Hamming distance of quantum signature (HDQS).
Figure 6:
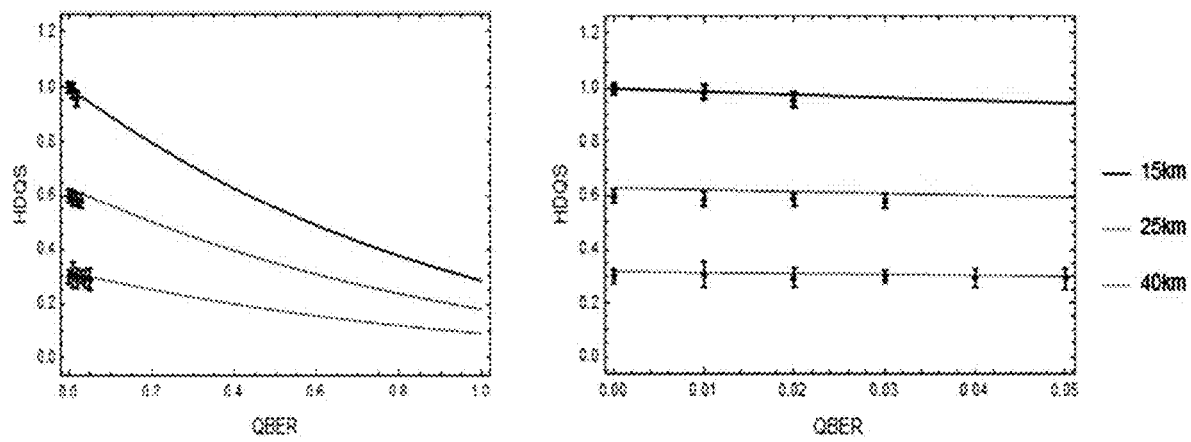

FIGS. 5 and 6 are graphs showing security verified using a HDQS.

According to a certificated quantum cryptography method in accordance with the present invention, a quantum cryptography server 130 verifies measurement outcomes of quantum public keys using the HDQS, and hence it is possible to confirm key integrity, authentication of key origin, authentication of communication entity and non-repudiation of key sharing. That is, according to the present invention, the security of key distribution can be completely verified by the HDQS.

First, the HDQS is described. The HDQS reflects a quantum bit error rate (QBER) of a quantum key distribution system, and is basically an expectation value of a Hamming distance. Preferably, the HDQS is used to predict an expectation value of a Hamming weight when a quantum state which is applied to conjugate coding is measured. The conjugate coding is a method of converting 2 bits into a quantum state, for example, 00→|0⟩, 01→|1⟩, 10→|+⟩, or 11→|−⟩, and will be described under the assumption that a public key $P_A$ of a first communication device 110 is "01." The public key is a result obtained by inputting a private key to a Merkle tree, and the first communication device 110 acquires a quantum public key $|P_A\rangle=|1\rangle$ by applying the conjugate coding to the public key $P_A=01$ and transmits the quantum public key to the quantum cryptography server 130. The quantum cryptography server 130 measures the received quantum public key $|P_A\rangle=|1\rangle$ with an arbitrary basis. When the measurement basis is a horizon-vertical basis (+), the measurement outcome $C_A$ is always 01(=|1⟩), and when the measurement basis is a diagonal basis (x), the measurement outcome $C_A$ is 10(=|+⟩) with a 50% probability of occurrence or 11(=|−⟩) with a 50% probability of occurrence. The above description is summarized as Table 1 below.

TABLE 1

| Quantum Public Key | |1⟩ | | |
|---|---|---|---|
| Measurement outcome $C_A$ | 01 | 10 | 11 |
| Probability of Occurrence | 0.5 | 0.25 | 0.25 |
| 3-Hamming Weight | 3 | 1 | 2 |
| Probability of Occurrence * 3-Hamming Weight | 0.5 * 3 = 1.5 | 0.25 * 1 = 0.25 | 0.25 * 2 = 0.5 |
| Total | | 2.25 | |

Referring to Table 1, a probability of occurrence of each of the measurement outcomes 01, 10, and 11 is 50%/o, 25%, and 25% and a 3-Hamming distance between a quantum public key and each of the measurement outcomes is 3, 1, and 2, and hence the product of each probability of occurrence and each 3-Hamming distance is 1.5, 0.25, and 0.5. The total value 2.25 is a HDQS, which is an expectation value of a Hamming weight when a quantum state to which conjugate coding is applied is measured.

Then, the first communication device 110 transmits signed basis information to a second communication device 120 and the second communication device 102 request the quantum cryptography server 130 to verify a quantum public key $|P'_A\rangle=|1\rangle$ obtained from the signed basis information. The quantum cryptography server 130 measures the received quantum public key $|P'_A\rangle=|1\rangle$ with the same basis as that previously used in measuring the quantum public key $|P_A\rangle=|1\rangle$. Consequently, when the received quantum public key $|P'_A\rangle=|1\rangle$ is measured with a horizon-vertical basis (+), a measurement outcome $C'_A$ is 01(=|1⟩) and when the measurement basis is a diagonal-antidiagonal basis (x), the measurement outcome $C'_A$ is 10(=+>) with a 50% probability of occurrence, or 11(=|→) with a 50% probability of occurrence. Additionally, when the measurement outcomes $C_A$ and $C'_A$ match each other, the quantum cryptography server 130 requests the first communication device 110 or the second communication device 120 for a public key $P_A$ or a public key $P'_A$ and verifies whether the measurement outcome $C_A$ or $C'_A$ matches the public key $P_A$ or the public key $P'_A$ using the HDQS. The above-described example corresponds to a case in which only a QBER issued when a measurement basis is erroneously selected is considered.

In another example in which a quantum state transfer rate, a quantum state measurement efficiency, and a QBER are considered, it is assumed that a public key $P_A$ of the first communication device 110 is "00||01||10||00||01||11||10||11." The first communication device 110 obtains a quantum public key $|P_A>=|0>_1|1>_2|+>_3|0>_4|1>_5|->_6|+>_7 \rightarrow_8$ by applying conjugate coding to the public key $P_A$=00||01||10||00||01||11||10||11 and transmits the quantum public key to the quantum cryptography server 130. In this case, a loss may occur in the transmission process and the measurement process, and accordingly the quantum cryptography server 130 may receive a quantum public key $|P_A>=|0>_1-|+>_3-|>_5-|+>_7-$. That is, although the first communication device 110 initially transmits 8 quantum public keys, the quantum cryptography server 130 receives only 4 quantum public keys due to a loss. The quantum cryptography server 130 measures the 4 quantum public keys with an arbitrary basis to obtain results shown in Table 2 below.

TABLE 2

| | Quantum Public Key $|P_A>$ | | | | | | |
|---|---|---|---|---|---|---|---|
| | $|0>_1$ | – | $|+>_3$ | – | $|1>_5$ | – | $|+>_7$ | – |
| Measurement Basis | + | | x | | x | | + | |
| Measurement outcome $C_A$ | 00 | | 11 | | 11 | | 01 | |

Here, a measurement outcome of the third quantum public key $|+>_3$ should be 10 by a diagonal (x) basis, but becomes 11 due to a quantum bit error. Then, the first communication device 110 transmits signed basis information to the second communication device 120, and the second communication device 120 requests the quantum cryptography server 130 to verify a quantum public key $|P'_A>=|0>_1|1>_2|+>_3|0>_4|1>_5\rightarrow_6|+>_7|\rightarrow_8$ obtained from the signed basis information. In this case, a loss occurs in the transmission process and the measurement process as described above, and accordingly the quantum cryptography server 130 receives a quantum public key, such as $|P'_A>=-|>_2-|0>4|1>_5--|\rightarrow_8$. Although the first communication device 110 initially generates and transmits 8 quantum public keys to the quantum cryptography server 130, the quantum cryptography server 130 ultimately receives only 4 quantum public keys due to a loss. The quantum cryptography server measures the 4 quantum public keys with an arbitrary basis and obtains a result as shown in Table 3 below.

TABLE 3

| | Quantum Public key $|P'_A>$ | | | | | | |
|---|---|---|---|---|---|---|---|
| | – | $|1>_2$ | – | $|0>_4$ | $|1>_5$ | – | – | $|->_8$ |
| Measurement Basis | | + | | + | x | | | x |
| Measurement outcome $C'_A$ | | 01 | | 01 | 11 | | | 11 |

Here, a measurement outcome of the third quantum public key 10>4 should be 00 by a vertical (+) basis, but becomes 01 due to a quantum bit error. In a case in which no loss or error occurs, whether the measurement outcomes $C_A$ and $C'_A$ completely match each other may be confirmed using an ordinary Hamming distance, but actual measurement outcomes $C_A$ and $C'_A$ in which a loss or an error occurs cannot be verified using such a general method, and hence the quantum cryptography server 130 combines the measurement outcomes $C_A$ and $C'_A$ as shown in Table 4 below.

TABLE 4

| Measurement outcome $C_A$ | 00 | | 11 | | 11 | | 01 |
|---|---|---|---|---|---|---|---|
| Measurement outcome $C'_A$ | | 01 | | 01 | 11 | | 11 |
| Combined Measurement outcome | 00 | 01 | 11 | 01 | 11 | 01 | 11 |

The quantum cryptography server 130 requests the first communication device 110 or the second communication device 120 for a public key $P_A$ or a public key $P'_A$ in order to verify the combined measurement outcome. Table 5 shows the public keys and the combined measurement outcomes.

TABLE 5

| Public Key $P_A$ | 001 | 012 | 103 | 004 | 015 | 015 | 107 | 118 |
|---|---|---|---|---|---|---|---|---|
| Combined Measurement outcome | 00 | 01 | 11 | 01 | 11 | | 01 | 11 |

There are 8 public keys, but 7 combined measurement outcomes are obtained, and thus the quantum cryptography server 130 verifies only the 7 measurement outcomes. When the quantum cryptography server 130 chooses a correct measurement basis, the public key and the combined measurement outcome may completely match each other. For example, the first, second and eighth measurement outcomes may completely match the public key. However, the third, fourth, and seventh measurement outcomes may match only half of the public key, or may not match the public key at all due to occurrence of an incorrect measurement basis or a quantum state error. The HDQS is used for such a case, and it verifies a degree of matching between a quantum public key obtained by applying conjugate coding to the public key and a result of measuring the quantum public key with an arbitrary basis.

That is, as can be seen from the above description, the measurement outcome cannot completely match the public key, which is initial information, since a fundamental problem in that an arbitrary measurement basis cannot be used is mixed with problems in actual implementation, such as a loss and an error. However, according to the present invention, a degree of discrepancy between the public key and the measurement outcome can be calculated as a probability using the HDQS, and an expectation value of a Hamming distance between the public key and the measurement outcome can be theoretically computed, thereby reassuring integrity. Hereinafter, a specific method of obtaining an expectation value of a Hamming weight is described.

In a process of deriving a HDQS, discrepancy between two sequences may be expressed as Equation 2 below. Here, Equation 2 is the product of a Hamming weight $H_k$ and a probability $P_k$ of an event corresponding to the Hamming weight $H_k$, and the discrepancy between the two sequences is an average of Hamming weights of $P^{(i)}$ and $c^{(i)}$, where $P^{(i)}$ and $c^{(i)}$ are elements of measurement outcomes C of a public key P and a quantum public key $|P>$, respectively, and a size of each of $P^{(i)}$ and $c^{(i)}$ is L.

$$\sum_{k=0}^{2} H_k P_k = H_0 P_0 + H_1 P_1 + H_2 P_2 \qquad \text{[Equation 2]}$$

In Equation 2, since $H_2$ is 0, $H_2 P_2$ always becomes 0 regardless of a probability value of $P_2$. That is, even when $P_2$ has a large probability value, it cannot affect an average value of the Hamming weights, and thus Equation 2 cannot accurately quantify an expectation value of $D(p^{(i)}, c^{(i)})$.

Therefore, to solve the problem, the Hamming weight may be re-defined as shown in Equation 3 and Equation 2 may be modified as shown in Equation 4 according to the Hamming weight defined in Equation 3.

$$\tilde{H}_k \equiv 3 - H_k. \qquad \text{[Equation 3]}$$

$$\sum_{k=0}^{2} \tilde{H}_k P_k = \tilde{H}_0 P_0 + \tilde{H}_1 P_1 + \tilde{H}_2 P_2 \qquad \text{[Equation 4]}$$

Here, $\tilde{H}_2$ is 3 when $p^{(i)}$ and $c^{(i)}$ completely match each other, $\tilde{H}_0$ is 1 when $p^{(i)}$ and $c^{(i)}$ are totally different from each other, and $\tilde{H}_1$ is 2 when $p^{(i)}$ matches only half of $c^{(i)}$.

An expectation value $\Sigma_{k=0}^{2} \tilde{H}_k P_k$ in Equation 5 of the Hamming distance $D(p^{(i)}, c^{(i)})$ described above is considered only in an ideal case, and in an actual quantum key distribution system in which conjugate coding is executed, a QBER is generated as a result of various factors.

For example, even when a measurement outcome $p^{(i)}$ is 10, a measurement outcome $c^{(i)}$ may become 11. In this case, a Hamming weight $\tilde{H}_Q$ is 2, like $\tilde{H}_1$. Here, a probability of $\tilde{H}_Q$ is $P_Q$, and $P_Q$ is a QBER to which a probability of ½ is multiplied, and indicates a probability of randomly selecting a measurement basis $\sigma_z$ (horizon-vertical basis (+)) or $\sigma_x$ (diagonal-antidiagonal basis (x)). Consequently, a probability of a Hamming weight $\tilde{H}_2$ is reduced to $P_3 - P_Q$, and accordingly, an expectation value of the Hamming distance $D(p^{(i)}, c^{(i)})$ should include a case in which a QBER occurs, as shown in Equation 5 below.

$$\tilde{H}_0 P_0 + \tilde{H}_1 P_1 + \tilde{H}_Q P_Q + \tilde{H}_2 (P_2 - P_Q) \qquad \text{[Equation 5]}$$

Hence, the HDQS is the L-th power of Equation 5, and is obtained as shown in Equation 6 below.

$$\text{HDQS} = [\tilde{H}_0 P_0 + \tilde{H}_1 P_1 + \tilde{H}_Q P_Q + \tilde{H}_2 (P_2 - P_Q)]^L \qquad \text{[Equation 6]}$$

Here, L is a size of a public key P and a quantum public key $|P>$. For example, considering a case in which $P_2=0.5$, $P_1=0.25$, and $P_0=0.25$, as ideal probabilities in Equation 6, a HDQS is determined by a QBER. Therefore, when a QBER is 0%, a maximum value of HDQS becomes $(2.25)^L$, and when a QBER is 100%, a minimum value of HDQS becomes $(1.75)^L$. In this case, when a QBER is 10% and L is 4, the HDQS becomes $(2.2)^4 \approx 23.42$. A HDQS of a quantum signature scheme implemented under the same conditions as above should be close to $(2.2)^4 \approx 23.42$, and when the HDQS is not close to $(2.2)^4 \approx 23.42$, the message integrity may not be reassured. The above conditions are merely examples, values of $P_2$, $P_1$, $P_0$, QBER, and L may be changed, and, preferably, based on a theoretical value of the HDQS according to the simulated QBER as shown in FIG. 5, when a measurement value of a quantum public key deviates from an error range of a theoretical simulation result under a particular condition, it may be determined that there is a problem in the integrity of the signed basis information.

By using the HDQS as described above, it is possible to verify security of key distribution as shown in FIGS. 5 and 6. Referring to FIG. 5, a graph on the left in FIG. 5 shows a result of simulating a HDQS when a QBER is 0 to 50% and a size L of a public key is 0 to 8 and a graph on the right shows a result of simulating a HDQS when a QBER is 0 to 4% and the size L of a public key is 0 to 8. Referring to FIG. 6, FIG. 6 shows changes in QBER and values of HDQSs according to a communication distance. A graph on the left in FIG. 6 shows a result of simulating a HDQS when a QBER is 0 to 100% and a communication distance is 15, 25, and 40 km and a graph on the right shows a result of simulating a HDQS when a QBER is 0 to 5% and a communication distance is 15, 25, and 40 km.

As described above, according to the present invention, it is possible to provide a quantum cryptography system to which quantum entity authentication and key authentication, which are safe unlike a digital signature of modern cryptography that is threatened by a quantum computer, are applied.

In addition, it is possible to provide a quantum cryptography platform for quantum key distribution, quantum signature, quantum entity authentication, quantum key authentication, and the like in a single system, and it is possible to provide a complete cryptography system which provides integrity, authentication, and non-repudiation. That is, it is possible to ensure entity authentication for a transmitter and a receiver that generate a key, key authentication for verifying that a secret key has been generated by a valid transmitter and receiver, and non-repudiation to prevent the transmitter and receiver from denying that they have received a secret key.

Further, implementation is easy since conjugate coding of a conventional quantum cryptography system is used intact and quantum entity authentication and key authentication certificated by a public announcement are applied.

The quantum cryptography method according to one embodiment of the present invention may also be embodied as computer readable codes on a computer readable recording medium. The computer readable recording medium is any data storage device that can store data which can be thereafter read by a computer system.

Examples of the computer readable recording medium include a read-only memory (ROM), a random-access memory (RAM), CD-ROMs, magnetic tapes, floppy disks, portable storage devices, optical data storage devices, and the like. The computer readable recording medium can also be distributed through network coupled computer systems so that the computer readable code is stored and executed in a distributed fashion.

Although the exemplary embodiments of the certificated quantum cryptography system and method according to the present invention have been described with reference to the drawings, the present invention is not limited thereto. Thus, it is intended that the present invention covers all modifications provided they come within the scope of the appended claims and drawings and their equivalents.

REFERENCE NUMERALS

100: QUANTUM CRYPTOGRAPHY SYSTEM
110: FIRST COMMUNICATION DEVICE
120: SECOND COMMUNICATION DEVICE
130: QUANTUM CRYPTOGRAPHY SERVER

What is claimed is:

1. A certificated quantum cryptography method which is performed by a quantum cryptography server connected to a first communication device and a second communication device which perform quantum key distribution, the certificated quantum cryptograph method comprising operations of:
   (a) receiving a first quantum public key generated by the first communication device and a second quantum public key generated by the second communication device and registering measurement outcomes of the first and second quantum public keys;
   (b) when first basis information and second basis information acquired by performing quantum key distribution between the first and second communication devices are signed and exchanged, receiving a third quantum public key generated by the second communication device on the basis of the first basis information and a fourth quantum public key generated by the first communication device on the basis of the second basis information and registering measurement outcomes of the third and fourth quantum public keys; and
   (c) verifying whether the first quantum public key matches the third quantum public key and whether the second quantum public key matches the fourth quantum public key.

2. The certificated quantum cryptography method of claim 1, further comprising, prior to the operation (a), receiving and registering first authentication information generated by the first communication device and second authentication information generated by the second communication device.

3. The certificated quantum cryptography method of claim 2, wherein the operation (a) comprises, when the first authentication information is received with the first quantum public key from the first communication device, checking whether the received first authentication information matches registered first authentication information, and, when the second quantum public key is received with the second authentication information from the second communication device, checking whether the received authentication information matches registered second authentication information.

4. The certificated quantum cryptography method of claim 1, wherein the operation (a) comprises generating, by the first communication device, a first private key sequence, a first verification parameter, and the first quantum public key, and generating, by the second communication device, a second private key sequence, a second verification parameter, and the second quantum public key,
   wherein each of the first and second verification parameters is a child node of a Merkle tree which is applied to each of the first and second private key sequences and each of the first and second quantum public keys is obtained by continuously applying the Merkle tree and conjugate coding to private keys included in each of the first and second private key sequences.

5. The certificated quantum cryptography method of claim 1, wherein the operation (b) comprises:
   when the first communication device receives an information encoded photon in a predetermined polarization state from the second communication device, acquiring, by the first communication device, a raw key on the basis of the photon in the predetermined polarization state; and
   generating the first basis information including a first basis used in acquiring the raw key and signing the first basis information,
   wherein the first basis information includes the first basis, a first private key, and a first verification parameter, the first private key corresponds to one private key in the first private key sequence, and the first verification parameter corresponds to generation information used in generating a first public key.

6. The certificated quantum cryptography method of claim 5, wherein the operation (b) comprises:
   when the second communication device receives the signed first basis information, acquiring, by the second communication device, a third public key by applying the first private key and the first verification parameter, which are included in the signed first basis information, to a Merkle tree; and
   acquiring the third quantum public key by applying the third public key to conjugate coding.

7. The certificated quantum cryptography method of claim 1, wherein the operation (b) comprises:
   when the first communication device receives the signed second basis information, acquiring, by the first communication device, a fourth public key by applying a second private key and a second verification parameter, which are included in the signed second basis information, to a Merkle tree; and
   acquiring the fourth quantum public key by applying the fourth public key to conjugate coding,
   wherein the second basis information includes a second basis, the second private key, and the second verification parameter, which are used in encoding information to photon in a predetermined polarization state by the second communication device, and wherein the second private key corresponds to one private key in the second private key sequence and the second verification parameter corresponds to generation information used in generating a second public key.

8. The certificated quantum cryptography method of claim 1, wherein the operation (c) comprises operations of:
   (c-1) in order to verify whether the first quantum public key matches the third quantum public key, comparing bit information for the measurement outcome of the first quantum public key and the measurement outcome of the third quantum public key to a measurement outcome of a quantum state corresponding to the bit information with an expectation value of a Hamming distance; and
   (c-2) in order to verify whether the second quantum public key matches the fourth quantum public key, comparing bit information for the measurement outcome of the second quantum public key and the measurement outcome of the fourth quantum public key to a measurement outcome of a quantum state corresponding to the bit information with an expectation value of a Hamming distance.

9. The certificated quantum cryptography method of claim 8, wherein the operation (c-1) comprises:
  combining the measurement outcome of the first quantum public key with the measurement outcome of the third quantum public key;
  comparing the combined measurement outcome to a first public key used in generating the first quantum public key or a third public key used in generating the third quantum public key; and
  computing an expectation value of a Hamming weight which indicates whether the combined measurement outcome matches the first public key or the third public key.

10. The certificated quantum cryptography method of claim 8, wherein the operation (c-2) comprises:
  combining the measurement outcome of the second quantum public key with the measurement outcome of the fourth quantum public key;
  comparing the combined measurement outcome to a second public key used in generating the second quantum public key or a fourth public key used in generating the fourth quantum public key; and
  computing an expectation value of a Hamming weight which indicates whether the combined measurement outcome matches the second public key or the fourth public key.

11. The certificated quantum cryptography method of claim 1, wherein in the operation (c), when it is verified that the measurement outcome of the first quantum public key matches the measurement outcome of the third quantum public key and the measurement outcome of the second quantum public key matches the measurement outcome of the fourth quantum public key, the first basis information generated and signed by the first communication device and the second basis information generated and signed by the second communication device are accordingly verified.

12. The certificated quantum cryptography method of claim 11, wherein, when it is verified that the measurement outcomes of the first and second quantum public keys match the measurement outcomes of the third and fourth quantum public keys, respectively, a quantum key sifted on the basis of the first and second bases is shared between the first and second communication devices.

13. A certificated quantum cryptograph system comprising:
  a first communication device;
  a second communication device which performs mutual key distribution with the first communication device; and
  a quantum cryptography server connected to the first and second communication devices,
  wherein the first communication device generates a first quantum public key, receives second basis information acquired by the second communication device according to quantum key distribution, and generates a fourth quantum public key on the basis of the second basis information,
  the second communication device generates a second quantum public key, receives first basis information acquired by the first communication device according to quantum key distribution, and generates a third quantum public key on the basis of the first basis information, and
  the quantum cryptography server verifies whether a measurement outcome of the first quantum public key matches a measurement outcome of the third quantum public key and whether a measurement outcome of the second quantum public key matches a measurement outcome of the fourth quantum public key.

14. The certificated quantum cryptography system of claim 13, wherein:
  the first communication device generates first authentication information;
  the second communication device generates second authentication information; and
  the quantum cryptography server receives and registers the first and second authentication information.

15. The certificated quantum cryptography system of claim 14, wherein:
  when the quantum cryptography server receives the first authentication information with the first quantum public key from the first communication device, the quantum cryptography server checks whether the received first authentication information matches registered first authentication information; and
  when receiving the second authentication information with the second quantum public key from the second communication device, checks whether the received second authentication information matches registered second authentication information.

16. The certificated quantum cryptography system of claim 13, wherein:
  the first communication device generates a first private key sequence, a first verification parameter, and the first quantum public key;
  the second communication device generates a second private key sequence, a second verification parameter, and the second quantum public key;
  each of the first and second verification parameters is a child node of a Merkle tree which is applied to each of the first and second private key sequences; and
  each of the first and second quantum public keys is obtained by continuously applying the Merkle tree and conjugate coding to private keys included in each of the first and second private key sequences.

17. The certificated quantum cryptography system of claim 13, wherein, when the first communication device receives an information encoded photon in a predetermined polarization state from the second communication device, the first communication device acquires a raw key on the basis of the photon in the predetermined polarization state, and generates the first basis information including a first basis used in acquiring the raw key and signs the first basis information,
  wherein the first basis information includes the first basis, a first private key, and a first verification parameter, the first private key corresponds to one private key in the first private key sequence, and the first verification parameter corresponds to generation information used in generating the first public key.

18. The certificated quantum cryptography system of claim 17, wherein, when the second communication device receives the signed first basis information, the second communication device acquires a third public key by applying the first private key and the first verification parameter, which are included in the signed first basis information, to a Merkle tree and acquires the third quantum public key by applying the third public key to conjugate coding.

19. The certificated quantum cryptography system of claim 13, wherein, when the first communication device receives signed second basis information, the first communication device acquires a fourth public key by applying a second private key and a second verification parameter, which are included in the signed second basis information, to a Merkle tree and acquires the fourth quantum public key by applying the fourth public key to conjugate coding,
wherein the second basis information includes a second basis, the second private key, and the second verification parameter, which are used in encoding information to photon in a predetermined polarization state by the second communication device, and wherein the second private key corresponds to one private key in the second private key sequence and the second verification parameter corresponds to generation information used in generating a second public key.

20. The certificated quantum cryptography system of claim 13, wherein the quantum cryptography server:
compares bit information for the measurement outcome of the first quantum public key and the measurement outcome of the third quantum public key to a measurement outcome of a quantum state corresponding to the bit information with an expectation value of a Hamming distance, in order to verify whether the first quantum public key matches the third quantum public key; and
compares bit information for the measurement outcome of the second quantum public key and the measurement outcome of the fourth quantum public key to a measurement outcome of a quantum state corresponding to the bit information with an expectation value of a Hamming distance, in order to verify whether the second quantum public key matches the fourth quantum public key.

21. The certificated quantum cryptography system of claim 20, wherein the quantum cryptography server:
combines the measurement outcome of the first quantum public key with the measurement outcome of the third quantum public key;
compares the combined measurement outcome to a first public key used in generating the first quantum public key or a third public key used in generating the third quantum public key; and
computes an expectation value of a Hamming weight which indicates whether the combined measurement outcome matches the first public key or the third public key.

22. The certificated quantum cryptography system of claim 20, wherein the quantum cryptography server:
combines the measurement outcome of the second quantum public key with the measurement outcome of the fourth quantum public key;
compares the combined measurement outcome to a second public key used in generating the second quantum public key or a fourth public key used in generating the fourth quantum public key; and
computes an expectation value of a Hamming weight which indicates whether the combined measurement outcome matches the second public key or the fourth public key.

23. The certificated quantum cryptography system of claim 13, wherein, when it is verified that the measurement outcome of the first quantum public key matches the measurement outcome of the third quantum public key and the measurement outcome of the second quantum public key matches the measurement outcome of the fourth quantum public key, the first basis information generated and signed by the first communication device and the second basis information generated and signed by the second communication device are verified.

24. The certificated quantum cryptography system of claim 23, wherein, when it is verified that the measurement outcomes of the first and second quantum public keys match the measurement outcomes of the third and fourth quantum public keys, respectively, a quantum key sifted on the basis of the first and second bases is shared between the first and second communication devices.

* * * * *